United States Patent [19]

Schoop et al.

[11] Patent Number: 4,667,811
[45] Date of Patent: May 26, 1987

[54] CHANNEL SECTIONS OF SCRAPER-CHAIN CONVEYORS

[75] Inventors: Gunther-Dietmar Schoop, Ottmarsbocholt; Franz Roling, Nordkirchen; Dieter Grundken; Manfred Redder, both of Lunen; Hartmut Schewinski, Kamen-Westick; Helmut Temme, Waltrop, all of Fed. Rep. of Germany

[73] Assignee: Gewerkschaft Eisenhutte Westfalia, Lunen, Fed. Rep. of Germany

[21] Appl. No.: 651,025

[22] Filed: Sep. 17, 1984

[30] Foreign Application Priority Data

Sep. 28, 1983 [DE] Fed. Rep. of Germany ....... 3335057

[51] Int. Cl.$^4$ ............................................ B65B 19/28
[52] U.S. Cl. .................................................. 198/735
[58] Field of Search ........................................ 198/735

[56] References Cited

U.S. PATENT DOCUMENTS

| | | | |
|---|---|---|---|
| 4,282,968 | 8/1981 | Temme | 198/735 |
| 4,307,802 | 12/1981 | Linder | 198/735 |
| 4,359,154 | 11/1982 | Temme | 198/735 |

FOREIGN PATENT DOCUMENTS

| | | | |
|---|---|---|---|
| 109221 | 11/1927 | Austria | 198/735 |
| 1254069 | 11/1967 | Fed. Rep. of Germany | 198/735 |
| 84/01359 | 4/1984 | World Int. Prop. O. | 198/735 |
| 2095195 | 9/1982 | United Kingdom | 198/735 |
| 442124 | 12/1974 | U.S.S.R. | |

*Primary Examiner*—Joseph E. Valenza
*Assistant Examiner*—D. Glenn Dayoan
*Attorney, Agent, or Firm*—Sughrue, Mion, Zinn, Macpeak and Seas

[57] ABSTRACT

A conveyor channel section or pan is composed of upper and lower components each having U-shaped rolled side walls with inwardly-directed flanges and floor plates. Additional side plates fixed to the exteriors of the side walls of the lower component project upwardly alongside the side walls of the upper component. Recesses in the side plates mate with fittings on the side walls of the upper component and upstanding nuts and bolts secure the fittings in the recesses. The end regions of the pan can be provided with inclined deep pockets formed within welded-in shaped joining pieces which receive toggle-like coupling pieces used to connact adjacent pans together.

26 Claims, 14 Drawing Figures

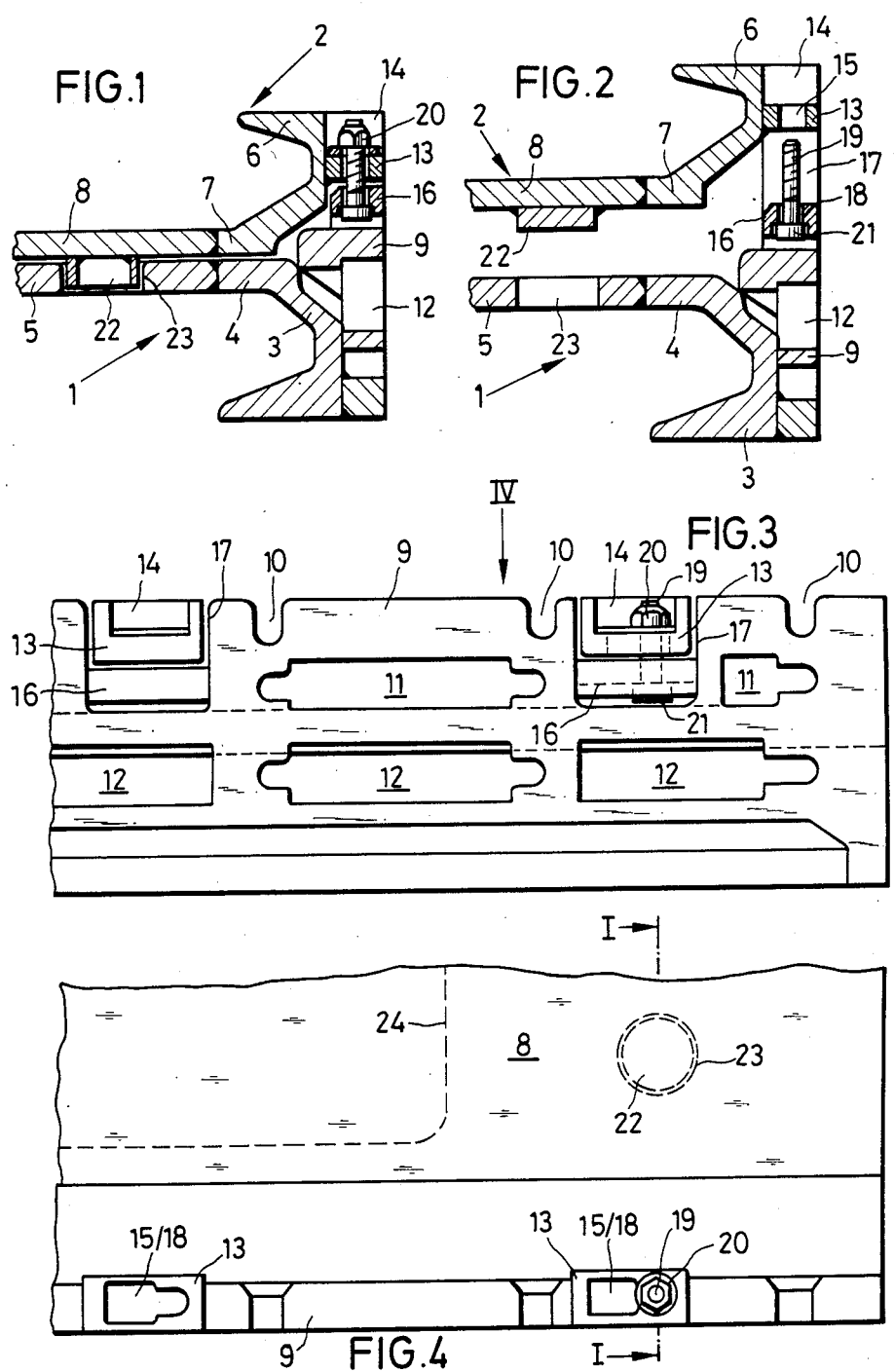

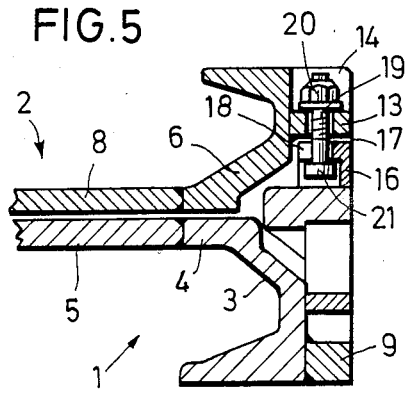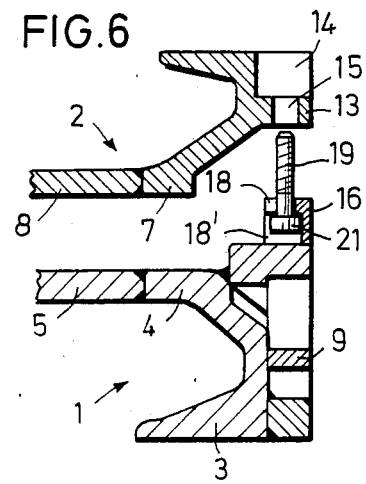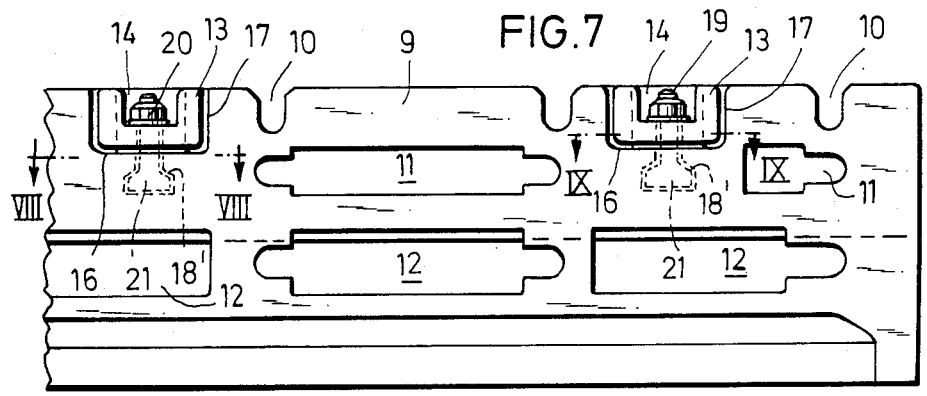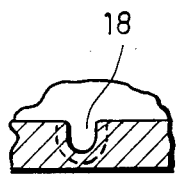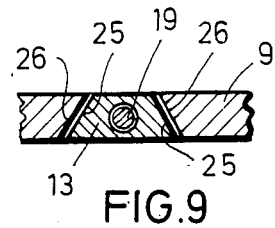

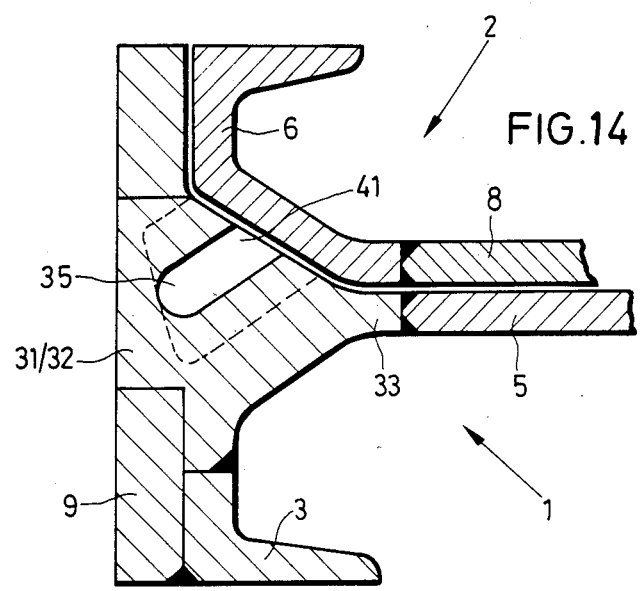

CHANNEL SECTIONS OF SCRAPER-CHAIN CONVEYORS

FIELD OF THE INVENTION

The present invention relates to scraper-chain conveyors as used in mineral mining and more particularly to the channel sections or pans of such conveyors.

BACKGROUND OF THE INVENTION

Scraper-chain conveyors as utilised in underground mineral mine workings are normally composed of a series of channels sections or pans joined end-to-end. A scraper-chain assembly is circulated along the pans in upper and lower runs. Each pan can be constructed from rolled side walls of general sigma-shaped profile with a floor plate welded between the side walls. The side walls are usually integral one-piece components but it is known to construct the side walls, as multi-part units. See, for example, German patent specifications Nos. 1073386, 970381, 848177, 902236, 1109087, 940636, 2906097, 1051727 and 2210897.

A general object of the invention is to provide an improved form of channel section for a scraper-chain conveyor.

SUMMARY OF THE INVENTION

A channel section or pan for a scraper-chain conveyor in accordance with the invention comprises as is known a pair of side walls with inwardly-directed flanges interconnected by a floor plate. The side walls can define trapezoidal inner guide surfaces for a scraper-chain assembly. The pan is sub-divided into upper and lower components each having a pair of side walls or profiled bars of generally U-shaped profile and preferably rolled sections. The side walls of at least the lower components are arranged with a floor plate connected therebetween as by welding. Upstanding side plates are fixed to the exteriors of the side walls of the lower component to project alongside the side walls of the upper component. Fittings are provided on the side walls of the upper component and engage within apertures in these side plate. Connectors, such as nuts and bolts or similar screw-threaded elements, are used to fix the fittings in a detachable manner in the apertures to unite the components.

A channel section in accordance with the invention is particularly stable and of versatile construction and can be fabricted at reasonable cost. The individual components are relatively small in height and can be transported and stored quite easily.

The upper component can be replaced as a whole or in parts after wear. The upper component can be normally lifted clear of the lower component after release of the connectors without relative horizontal displacement. It is however possible to interconnect the components by welding.

Preferably separate floor plates extend between both the upper flanges of the lower component and between the lower flanges of the upper component. The fittings can be stout U-shaped blocks providing convenient access to the connectors. The fittings can abut on stop faces formed at the bases of the apertures either inherently or by the provision of welded-in strips. Bores in at least the fittings receive the connectors. Where the connectors take the form of nuts and bolts the side plates may have recesses or the like for accommodating the heads of the bolts or the nuts. The fittings may also engage in a shape-locked manner within the recesses to resist forces transverse to the channel section and to align the components. In this aspect, tongue and groove connections or dovetail connections can be provided between the fittings and the apertures.

The side plates, which can extend to any height beyong the lower component, preferably extend to the upper flanges of the side walls of the upper component. Additional apertures of shaped profile in one or both the side plates can receive additional bolts directed outwardly of the channel section to permit attachments such as guard plates and other accessories to be secured thereto. The upper component can be lifted clear of the lower component with the attachments left in place if desired and conversely, during assembly, the upper component can be installed with attachments fitted to the side plate or plates. One of the side plates may be shaped to constitute part of a guide for a machine.

To align the upper and lower components it is useful to provide centering means, such as interengageable projections and recesses or plates and apertures, conveniently between the respective floor plates of the upper and lower components. A convenient arrangement is to cut an opening in the lower floor plate to permit access to the lower scraper-chain assembly run and to weld the cut-off plate section to the underside of the upper floor plate in registry with the opening.

In order to facilitate interconnection between channels sections, joining pieces can be welded into apertures cut in end regions of each channel section. These joining pieces, which match the shape of the side walls, then possess shaped pockets which receive coupling pieces. The pockets open inwardly of the channel section and are located in inclined dispositions in thick portions of the joining pieces to extend relatively deeply and terminate within boundaries defined by the sides of the side plates. The pockets may have slot-like openings for receiving narrow central webs of the coupling pieces. These openings can be disposed above the floor plate extending between the upper flanges of the side walls of the lower component and laterally outwardly thereof, the openings being covered by the upper flanges of the side walls of the upper component.

It is conventional to use interengageable coupling means on the ends of channel sections to interconnect the latter and the joining pieces themselves may be additionally modified to engage one with another across adjacent ends of the channel sections as with projections and recesses. The openings and pockets can be accessible at all times or else covered by the upper component so that release or insertion of the coupling pieces is only possible if the connectors linking the components together are released. In the latter arrangement the coupling pieces are reliably secured in position and the entry of dirt in the pickets is prevented.

The invention may be understood more readily, and various other aspects and features of the invention may become apparent, from consideration of the following description.

BRIEF DESCRIPTION OF DRAWINGS

Embodiments of the invention will now be described, by way of examples only, with reference to the accompanying drawings, wherein:

FIG. 1 is a sectional end view of part of a conveyor channel section constructed in accordance with the invention;

FIG. 2 is a view corresponding to FIG. 1 but showing the upper component separated from the lower component thereof;

FIG. 3 is a side view of the channel section shown in FIGS. 1 and 2;

FIG. 4 is a plan view of the conveyor channel section part depicted in FIGS. 1 to 3, the view being taken in the direction of arrow IV in FIG. 3;

FIG. 5 is a sectional end view of part of another conveyor channel section constructed in accordance with the invention;

FIG. 6 is a view corresponding to FIG. 5 but showing the upper component separated from the lower component thereof;

FIG. 7 is a side view of the channel section shown in FIGS. 5 and 6;

FIG. 8 is a detail sectional plan view of a region of the channel section depicted in FIGS. 5 to 7, the view being taken along the line VIII—VIII in FIG. 7;

FIG. 9 is a detail sectional plan view of a region of the channel section depicted in FIGS. 5 to 8 the view being taken along the line IX—IX in FIG. 7 and showing a modification to the construction;

FIGS. 14 is a view corresponding to FIG. 12 but depicting a modified arrangement.

DESCRIPTION OF PREFERRED EMBODIMENTS

Figure 10:
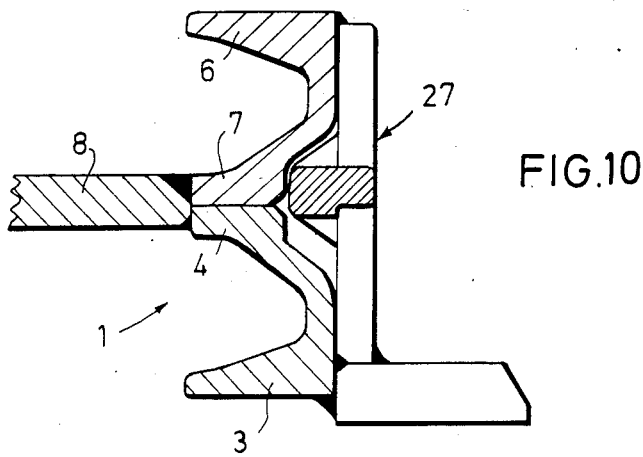
FIG. 10 ia a sectional end view of part of a further conveyor channel section constructed in accordance with the invention.

As represented in FIGS. 1 to 3, a channel section or pan for a scraper-chain conveyor is composed of an upper component 2 and a lower component 1. The components 1, 2 are detachably secured to one another and define upper and lower guide passages for the upper and lower runs of a scraper-chain assembly (not shown). The lower component 1 is composed of a pair of symmetrical rolled bars or walls 3 (only one of which is illustrated) having a generally U-shaped configuration with upper and lower inwardly projecting flanges. A floor plate 5 is welded between the upper flanges 4 of the side walls 3. The lower flanges of the side walls 3 rest on the floor of the mine working and a cover plate can be used to interconnect these flanges to close off the lower run of the scraper-chain assembly. The upper component 2 is similarly composed of a pair of symmetrical rolled side walls 6 or bars with a floor plate 8 welded between the lower flanges of the side walls 6. The individual components 1, 2 are superimposed one upon the other as depicted. The side walls 3 of the lower component 1 have upstanding plates 9 welded to their exteriors to form further side walls. The walls or plates 9 extend over substantially the entire length of the channel section and project upwardly beyond the floor plates 5, 8 and preferably up to the level of the upper flanges of the side walls 6 of the upper component 2 when the components 1, 2 are secured together. It is however possible to have the plates 9 terminate above or below the upper flanges of the side walls 6. As shown in FIG. 3 the plate 9 as depicted possesses shaped apertures 10, 11, 12 arranged in rows and distributed over the length of the channel section. The apertures 10 to 12 enable the heads of bolts to be located and held captive in known manner to permit attachments, such as guard plates, and the like to be secured to the channel section. The plates 9 can be fabricated by forging. The plates 9 also serve to establish a disengageable connection betwen the upper and lower components 1, 2 of the channel section. Thus, as illustrated, the side wall 6 of the upper component 2 has fittings 13 welded to its exterior and distributed over the length of the component 2. These fittings 13 each have U-shaped profile defining an open pocket 14 terminating at the level of the upper flange of the associated upper component 2. The fittings 13 have bores 15 therein at the bases of the pockets 14. The plates 9 have corresponding rectangular apertures 17 open from above disposed between the apertures 10, 11 which locate with the fittings 13. As the bases of the apertures 17 there are welded in strips 16 which form stops for the fittings 13. The fittings 13 and the associated apertures 17 may interengage in shaped-locked manner. The strips 16 also have bores 18 which align with the bores 15. Upstanding bolts 19 project through the bores 15, 18 and nuts 20 are engaged on the bolts 19 thereby to secure the components 1, 2 together. The pockets 14 permit a spanner to be used to tighten or release the nuts 20. The heads 21 of the bolts 19 may be held captive by stepped recesses or counter-bores co-axial with the bores 18. The bolts can be introduced into the bores 18, 15 or removed from beneath, by making the bores 18 elongate or key-hole shaped as shown in FIG. 4. The bores 15 can also, or alternatively, be shaped in this manner and the bolts can be inverted. Instead of adopting detachable bolts 19 it is also possible to fix the bolts 19 to the strips 16 as by welding or to use upstanding threaded studs fixed to the strips 16.

The underside of the floor plate 8 of the upper component 2 is provided with several projections 22 which can take the form of annular blocks welded to the plate 8. The upperside of the floor plate 5 of the lower component 1 is provided with corresponding openings 23 which receive the projections 22. Conveniently the projections and recesses 22, 23 are located in pairs near the ends of the components 1, 2 and collectively at the corners of a rectangle. The components 1, 2 can thus be brought into the correct orientation and locked by the inter-engagement between the projection and recesses 22, 23 while the actual securing of the components 1, 2 is achieved with the nuts-and-bolts 19, 20. FIG. 1 depicts the components 1, 2 secured together and FIG. 2 depicts the upper component 2 lifted clear of the lower component 1. Instead of using the projections 22 and recesses 23 to locate the components 1, 2 and to lock the components 1, 2 against relative horizontal displacement, one of the floor plates 5, 8 may have a single block or plate which fits into an opening in the other of the floor plates 8, 5. Thus, as shown in FIG. 4 by chain-dotted lines 24, the underside of the floor plate 8 has a rectangular plate welded thereto and engaging in a opening in the floor plate 5. Conveniently, the plate on the underside of the floor plate 8 is the part removed from the floor plate 5 to form the opening. By making this plate and opening of sufficiently large size the opening can also serve an additional purpose in allowing visual inspection and repair of the scraper-chain assembly beneath the floor plate 5. The provision of the above-described centering means 22, 23, 24 is not essential since the interengagement of the fittings 13 and the apertures 17 may suffice to locate the components 1, 2.

FIGS. 5 to 7 depict a modified construction similar to that described in connection with FIGS. 1 to 4 and accordingly like reference numeral are used to denote like and analagous parts. In constrast to FIGS. 1 to 4, the strips 16 fitted into the apertures 17 are no longer present and the fittings 13 each abut an integral portion of the plate 9 at the base of the associated opening 17 and also denoted 16 for convenience. These portions 16 are recessed as at 18' at their inside to permit the heads 21 of the bolts 19 to be engaged through the bores 18 which are open inwardly of the plate 9 as shown in FIG. 8. As shown in FIG. 5, the presence of the associated side wall 6 of the upper component 2 serves to maintain the bolts 19 in position laterally.

The fittings 13 and the apertures 17 serve to locate the components 1, 2 horizontally in the conveying direction, i.e. longitudinally of the pan and as mentioned they may serve alone to align the components 1, 2 during assembly. However where the centering means 22, 23, 24 is not employed the nuts-and-bolts 19, 20 must serve to resist dynamic forces directed primarily transversely to the conveyor in a direction across the pan. Where these forces are high there is a danger than the bolts 19 can shear and this is especially the case where transverse shifting forces imparted by shifting rams or mining machine control forces must be taken up by the pans. To provide a more robust and rigid structure, the fittings 13 and the apertures 17 may be additionally shaped, for example, to engage along vertical or near vertical faces provided by recessed shoulders. FIG. 9 illustrates another possible construction where vertical faces 25, 26 of the fittings 13 and the apertures 17 are bevelled to form a dovetail-type joint orientated to resist inwardly directed transverse forces. Another form of connection between the fittings and apertures 13, 17 is a tongue and groove type connection.

Figure 11:
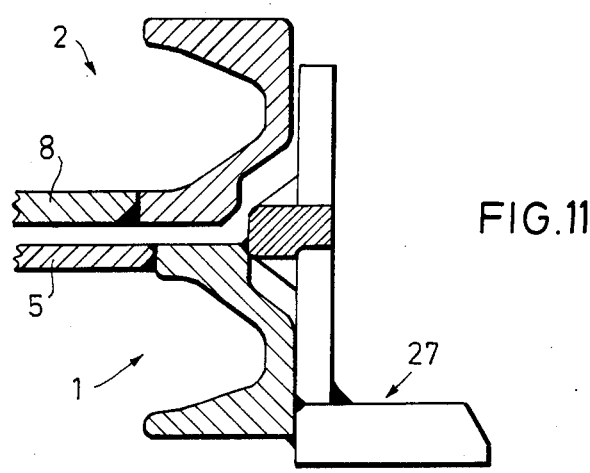
FIG. 11 is a view corresponding to FIG. 10 but depicting a modified channel section construction.

The plate 9 fixed to the lower component 1 in the embodiments described serve to establish connection between the components 1, 2 as well as to permit attachments to be fitted to the composite pan. Such attachments can take the form of sections of a plough guide. However at least one of the plates 9 can be replaced by an L-shaped plate 27 itself serving overall as a section of a hewing machine guide as shown in FIG. 10. In this embodiment, a single floor plate 8 is used to join the flanges 7, 4 of the walls 3, 6 together. However as represented in FIG. 11, the separate components 1, 2 with their separate floor plates 5, 8 can be detachably secured in any of the ways described above in connection with FIGS. 1 to 9 with the plate 27 having the apertures 17 and the strips 16 or regions 16 for receiving the fittings 13 and the bolts 19. It is also possible to modify the structure still further so that the upper floor plate 8 is no longer welded to the flanges 7 but is used simply as a replaceable wear plate.

Figures 12, 13:
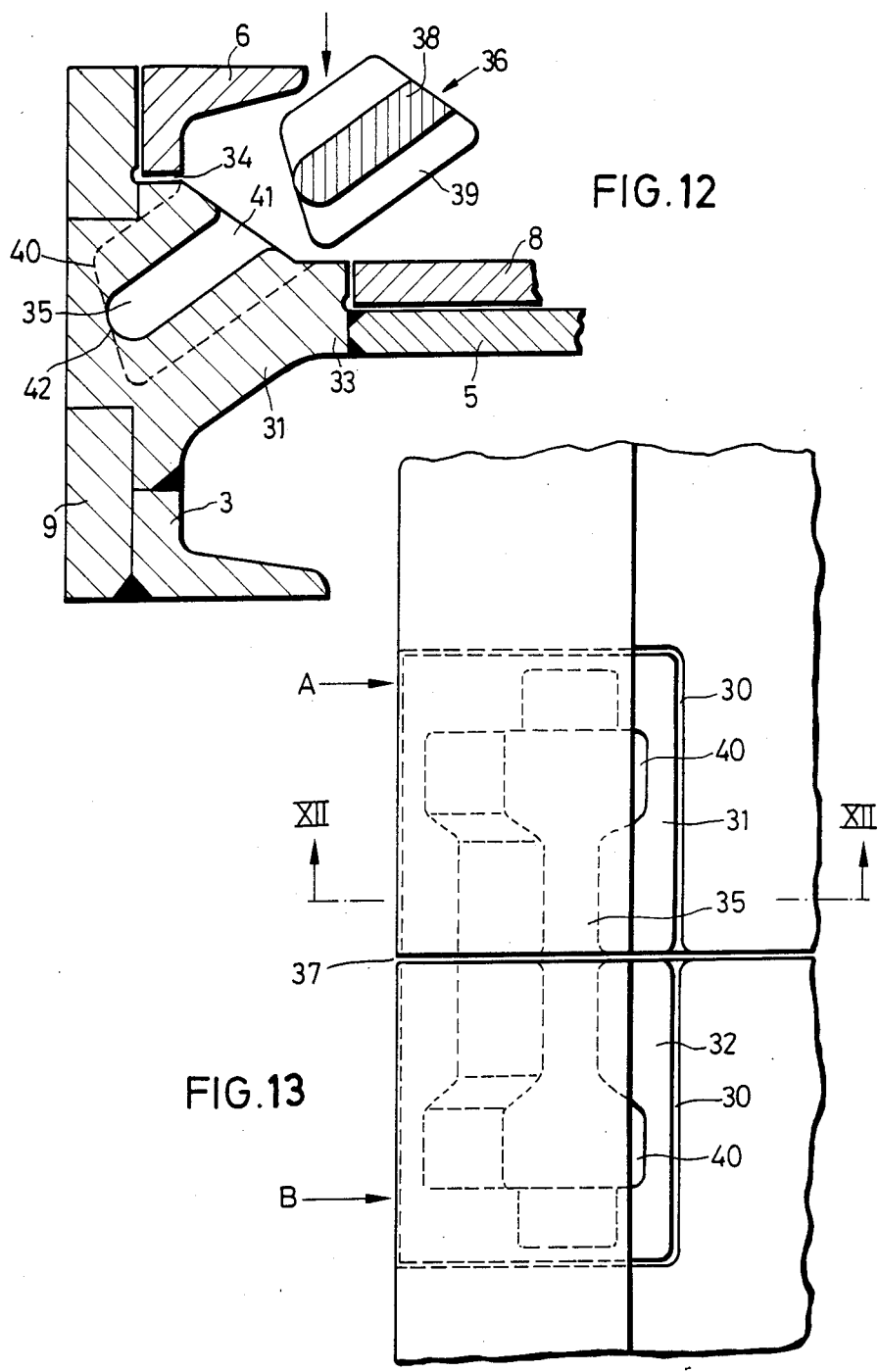
FIG. 12 is a sectional end view of part of an end region of a conveyor channel section constructed in accordance with the invention, the view being taken along the line XII—XII of FIG. 13.
FIG. 13 is a plan view of the end regions of parts of a pair of interconnected channel sections constructed in accordance with the invention.

FIGS. 12 and 13 depict a form of connection between adjacent channel sections or pans. In these Figures only one of the two sides of the pan is illustrated as in the previously described coinstructions. As shown the side walls 3 of the end regions A and B of the lower components 1 of the pans and the plates 9 welded thereto are provided with rectangular cut-outs or apertures 30 (FIG. 13) into which a separate joining piece 31, 32 is welded preferably with additional shape-locking engagement. It is conventional to use couplings between the adjacent pans in the form of shells and sockets so that one channel section end carries a projection and the other channel section end has a corresponding recess. The coupling pieces 31, 32 can also be constructed in this manner so that, for example, the coupling pieces 31 have spigots which engage within openings in the coupling pieces 32. The joining pieces 31, 32 have inwardly directed flanges 33 which are welded to one or both floor plates 5, 8 and, for example, as illustrated in FIG. 12 to the lower floor plate 5. The joining pieces 31, 32 effectively replace the flanges 4, 7 of the side wall 3, 6 of the components 1, 2 over these end regions A, B. The joining pieces 31, 32 are additionally welded to bases formed by the cut away side walls 3. The components 2 over these end regions A, B are recessed at 34 to accommodate the joining pieces 31, 32. The upper floor plate 8 is connected with the side walls 6 outside these ends regions A, B as described previously and as illustrated in FIGS. 1 to 9. Accordingly the upper component 2 can still be disengageably and replaceably connected with the lower component 1 but it is possible to interconnect these components by welding if desired. The individual floor plates 5, 8 could then be replaced by single thicker floor plate as shown in FIG. 10.

Each of the welded-in joining pieces 31, 32 has an inclined pocket 35 open towards the interior of the pan into which a coupling piece in the form of a toggle 36 serving to interconnect the adjacent pans can be introduced. FIG. 13 shows the toggle connection between the ends region A, B of the pans in dotted outline and the gap between the adjacent channel sections is designated 37. The pockets 35 in the joining pieces 31, 32 combine to form a receptor for the coupling 36 of approximately H-shaped configuration and the corresponding coupling piece 36 has a flat central web 38 web with enlarged heads 39 at its ends. The web 38 can be introduced into narrow slot-like openings 41 of the pockets 35 while the heads 39 engage in enlarged end regions 40 of the pockets 35. With the aid of these toggle connections the pans are connected to resist traction forces in the conveying direction but the connections permit slight angular displacement as is known per se. The openings 41 of the pockets 35 lie laterally outwardly of, and above, the floor plate or plates 5, 8 but beneath the upper flange of the side walls 6 and are hence positioned in the section of the boundary of the guide passage extending from the floor to the side wall. The pockets 35 can be inclined at an angle of about 45° to the floor plates 5, 8. When the coupling pieces 36 are inserted into the pockets 35 they substantially fill the latter. The inclination of the pockets 35 makes it possible to cut the pockets 35 relatively deeply so that correspondingly robust coupling pieces 36 can be used. The innermost ends 42 of each of the pockets 35 preferably lies within the boundaries defined by the sides of the outermost side plate 9.

In the modified construction shown in FIG. 14 the joining pieces 31, 32 are welded into apertures 30 provided only in the floor 5, the side walls 3 of the lower component 1 and the plate 9 to replace the top flanges of the sides walls 3 and to preserve the profile of the guide passage over the lower run. The side walls 6 of the upper component 2 which are joined together by the floor plate 8 in the manner described are not altered while the lower floor plate 5 is additionally welded between the flanges 33 of the joining pieces 31, 32. The pockets 35 for receiving the coupling pieces 36, which are not shown in FIG. 14, have their openings 41 beneath the inclined region of the guide passage over the upper run extending from the upper web of the side walls 6 and the lower flanges of the upper component 2 connected with the floor plate 8. Thus the openings 41 are covered over by the side walls 6 and the coupling pieces 36 can only be inserted or withdrawn from the pockets 35 when the uppermost component 2 is removed. The coupling pieces 36 are however reliably secured in position by the presence of the uppermost component 2 and the pockets 35 are protected against the ingress of dirt.

We claim:

1. A channel section for a scraper-chain conveyor comprising; a base component composed of a pair of parallel generally U-shaped lower profiled bars, each lower profiled bar having a laterally-inwardly extending lower flange, a laterally-inwardly extending upper flange and an intermediate inclined lower wall portion joining the upper and lower flanges for forming the lower region of a laterally-outwardly facing V-shaped recess, a floor plate located between and welded to the upper flanges of said lower profiled bars and a support plate extending along the exterior side of at least one of said lower profiled bars and welded thereto, the support plate having an upper portion projecting above the level of the top flange of said at least one lower profiled bar and a lower portions terminating substantially at the base of the lower flange of said at least one lower profiled bar, a top component superimposed on said base component, said top component being composed of a pair of parallel generally U-shaped upper profiled bars, each upper profiled bar having a laterally-inwardly extending lower flange, a laterally-inwardly extending upper flange and an intermediate inclined upper wall portion joining the upper and lower flanges and forming the upper region of said laterally outwardly facing V-shaped recess, each upper profiled bar having its lower flange engaging the upper flange of an associated lower profiled bar, means joining the lower flanges of the upper profiled bars together, the upper portion of the support plate of the base component extending alongside one of the upper profiled bars terminating substantially at the top of the upper flange of said one upper profiled bar and means for detachably securing the top component to the base component, said securing means being composed of a series of individual open recesses in the upper portion of the support plate, a series of individual blocks fixed to the exterior of said one upper profiled bar which are received by the recesses, and detachable connectors for fastening the blocks to the upper portion of the support plate, wherein the recesses and blocks are dimensioned and arranged to lock into one another and restrict displacement between the base and top components in a direction longitudinal of the components.

2. A channel section according to claim 1, wherein the means joining the lower flanges of the upper profiled bars is another floor plate welded to said lower flanges.

3. A channel section for a scraper-chain conveyor comprising; upper and lower components, each component having a pair of side walls of generally U-shaped profile with upper and lower flanges, at least one floor plate being connected between the upper flanges of the side walls of the lower component, upstanding side plates fixed to the exteriors of the side walls of the lower component and projecting upwardly alongside the side walls of the upper component, apertures in the upper regions of the side plates at spaced locations, fittings on the side walls of the upper component in the form of U-shaped blocks welded to the side walls of the upper component said fittings being imposed at locations on the side walls to align with the apertures of the side plates and fit therein and connectors detachably joining the fittings in said apertures to the side plates whereby said joined fittings in said apertures inhibit displacement between said upper and lower components.

4. A channel section according to claim 3, wherein the fittings engage on stop faces at the bases of the apertures.

5. A channel section according to claim 3, wherein the connectors engage through bores in the fittings.

6. A channel section according to claim 4, wherein the stop faces are provided by strips welded into the apertures.

7. A channel section according to claim 5, wherein the fittings engage on stop faces at the bases of the apertures and the connectors also engage through bores in the stop faces.

8. A channel section according to claim 7, wherein the connectors take the form of nuts and bolts and the side plates have recesses for accommodating the heads of the bolts.

9. A channel section according to claim 5, wherein the connectors take the form of nuts and bolts and the side plates have open recesses for receiving the shanks and heads of the bolts.

10. A channel section according to claim 3, wherein the fittings and the apertures are shaped to lock with one another.

11. A channel section according to claim 10, wherein the fittings and the apertures inter-engage as dovetail-type joints.

12. A channel section according to claim 3, wherein there is a further floor plate connected between the lower flanges of the side walls of the upper component.

13. A channel section according to claim 3, wherein at least one of the side plates has further apertures arranged in rows distributed along the channel section and serving to permit attachments to be secured thereto.

14. A channel section according to claim 3, wherein the side plates have upper edges substantially aligned with the upper surfaces of the upper flanges of the side walls of the upper component.

15. A channel section according to claim 12, wherein the floor plates have inter-engageable projections and recesses which serve to align the components during assembly.

16. A channel section according to claim 12, wherein the further floor plate has an additional plate on its underside which engages in an opening in the floor plate connected between the side walls of the lower component thereby to align the components during assembly.

17. A channel section according to claim 3 and further comprising centering means for aligning the components during assembly.

18. A channel section according to claim 3, wherein the end regions thereof have joining pieces welded into apertures, the joining pieces being provided with pockets open inwardly of the channel section which serve to receive coupling pieces used to interconnect the channel section to another adjacent channel section.

19. A channel section according to claim 18, wherein the pockets have slot-like openings which are disposed above the floor plate extending between the upper flanges of the side walls of the lower component and laterally outwardly thereof, the openings being covered by the upper flanges of the side walls of the upper component.

20. A channel section according to claim 18, wherein the pockets are inclined in relation to the floor plate.

21. A channel section according to claim 18, wherein the joining pieces are additionally adapted to establish inter-engageable connection between the adjacent channel sections, each joining piece has an inwardly directed flange to which the floor plate is welded and the pockets are inclined with openings disposed above the floor plate in inclined faces of the joining pieces and inner ends terminating within boundaries defined by the side faces of the side plates.

22. A channel section for a scraper-chain conveyor comprising; upper and lower components, each component having a pair of side walls of generally U-shaped profile with upper and lower flanges, at least one floor plate being connected between the upper flanges of the side walls of the lower component, upstanding side plates fixed to the exteriors of the side walls of the lower component and projecting upwardly alongside the side walls of the upper component, apertures in the upper regions of the side plates at speced locations, fittings on the side walls of the upper component imposed at locations on the side walls to align with the apertures of the side plates and fit therein and connectors engaging through bores in the fittings and serving to detachably join the fittings in said apertures to the side plates whereby said joined fittings in said apertures inhibit displacement between said upper and lower components.

23. A channel section according to claim 22, wherein the fittings take the form of U-shaped blocks welded to the side walls of the upper component.

24. A channel section for a scraper-chain conveyor comprising; upper and lower components, each component having a pair of side walls of generally U-shaped profile with upper and lower flanges, at least one floor plate being connected between the upper flanges of the side walls of the lower component, upstanding side plates fixed to the exteriors of the side walls of the lower component and projecting upwardly alongside the side walls of the upper component, apertures in the upper regions of the side plates at spaced locations, fittings on the side walls of the upper component imposed at locations on the side walls to align with the apertures of the side plates and fit therein and connectors detachably joining the fittings in said apertures to the side plates whereby said joined fittings in said apertures inhibit displacement between said upper and lower components wherein the fittings engage on stop faces at the bases of the apertures which are provided by strips welded into the apertures.

25. A channel section for a scraper-chain conveyor comprising; upper and lower components, each component having a pair of side walls of generally U-shaped profile with upper and lower flangs, at least one floor plate being connected between the upper flanges of the side walls of the lower component, upstanding side plates fixed to the exteriors of the side walls of the lower component and projecting upwardly alongside the side walls of the upper component, apertures in the upper regions of the side plates at spaced locations, fittings on the side walls of the upper component imposed at locations on the side walls to align with the apertures of the side plates and fit therein and connectors detachably joining the fittings in said apertures to the side plates whereby said joined fittings in said apertures inhibit displacement between said upper and lower components wherein the fittings and apertures are shaped to lock with one another and inter-engage as dovetail-type joints.

26. A channel section for a scraper-chain conveyor comprising; upper and lower components, each component having a pair of side walls of generally U-shaped profile with upper and lower flanges, at least one floor plate being connected between the upper flanges of the side walls of the lower component, upstanding side plates fixed to the exteriors of the side walls of the lower component and projecting upwardly alongside the side walls of the upper component, apertures in the upper regions of the side plates at spaced locations, fittings on the side walls of the upper component imposed at locations on the side walls to align with the apertures of the side plates and fit therein and connectors detachably joining the fittings in said apertures to the side plates whereby said joined fittings in said apertures inhibit displacement between said upper and lower components wherein the side plates having upper edges substantially aligned with the upper surfaces of the upper flanges of the side walls of the upper component.

* * * * *